United States Patent
Oi

(10) Patent No.: US 8,054,372 B2
(45) Date of Patent: Nov. 8, 2011

(54) AUTOFOCUS CONTROL CIRCUIT, AUTOFOCUS CONTROL METHOD AND IMAGE PICKUP APPARATUS

(75) Inventor: Toshiharu Oi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 434 days.

(21) Appl. No.: 12/285,364

(22) Filed: Oct. 2, 2008

(65) Prior Publication Data

US 2009/0109320 A1  Apr. 30, 2009

(30) Foreign Application Priority Data

Oct. 26, 2007 (JP) ................................. 2007-279032

(51) Int. Cl.
*H04N 5/232* (2006.01)
(52) U.S. Cl. ...................................................... 348/349
(58) Field of Classification Search .................... 348/349
See application file for complete search history.

(56) References Cited

U.S. PATENT DOCUMENTS

| 6,798,447 | B1 * | 9/2004 | Katsuki ..................... 348/208.12 |
| 7,280,149 | B2 * | 10/2007 | Weintroub et al. ............ 348/349 |
| 2006/0017835 | A1 * | 1/2006 | Jacobsen ....................... 348/345 |
| 2009/0021595 | A1 * | 1/2009 | Zandifar et al. ............ 348/222.1 |

FOREIGN PATENT DOCUMENTS

| JP | 2000-333071 | 11/2000 |
| JP | 2002-10125 | 1/2002 |
| JP | 2003-153068 | 5/2003 |
| JP | 2004-15212 (A) | 1/2004 |
| JP | 2004-70226 (A) | 3/2004 |
| KR | 2001-0007083 | 1/2001 |

OTHER PUBLICATIONS

Korean Office Action dated Jan. 29, 2010, with partial English translation.
Notification of Reason(s) for Refusal dated Aug. 9, 2011, with English translation.

* cited by examiner

*Primary Examiner* — James Hannett
(74) *Attorney, Agent, or Firm* — McGinn IP Law Group, PLLC

(57) ABSTRACT

An image compression circuit provided in an image pickup apparatus for generation of compressed image data for record can also serve as an evaluation value calculation circuit that generates a contrast evaluation value to be used as an index for finding an in-focus location for an autofocus process. The image pickup apparatus includes a shooting optical system, an image pickup unit, an image compression unit, and a focusing unit. The image pickup unit has an image pickup device that performs photoelectric conversion of a subject image formed by the shooting optical system, and performs A/D conversion of a captured image obtained by the image pickup device to generate digital captured image data. The image compression unit performs an image compression process on the digital captured image data to generate compressed image data for focusing. The focusing unit adjusts the imaging location of the subject image formed by the shooting optical system on the basis of the data size of the compressed image data for focusing generated by the image compression unit.

17 Claims, 7 Drawing Sheets

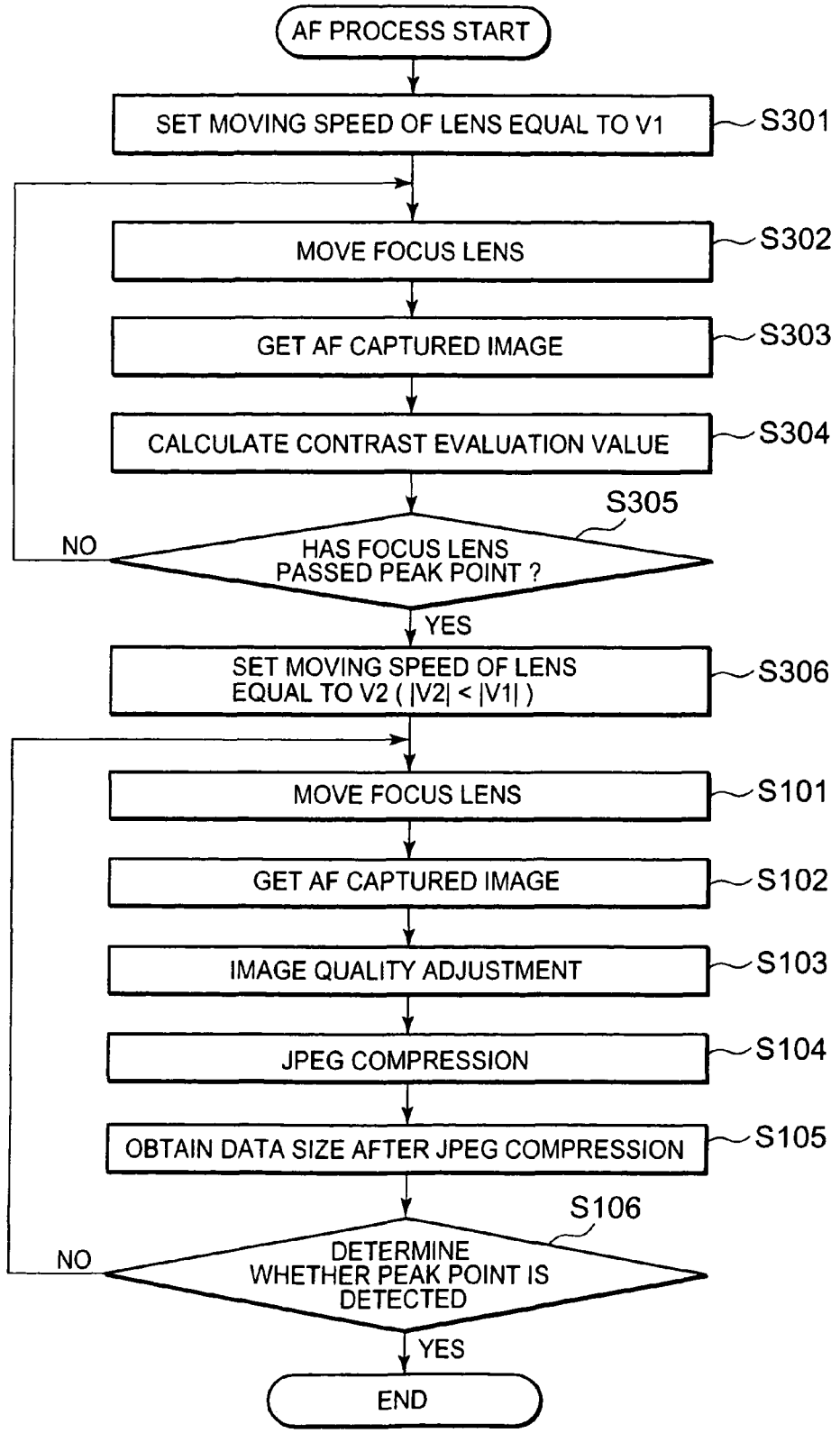

AUTOFOCUS CONTROL CIRCUIT, AUTOFOCUS CONTROL METHOD AND IMAGE PICKUP APPARATUS

BACKGROUND OF THE INVENTION

1. Field of the Invention

The present invention relates to an image pickup apparatus and more particularly to autofocus technique, for use in an image pickup apparatus, for automatically determining a focusing condition of a subject image.

2. Description of the Related Art

Image pickup apparatuses such as a digital still camera and a digital video camera having an image pickup device such as a charge coupled device (CCD) sensor or a complementary metal oxide semiconductor (CMOS) sensor are in practical use. A contrast detection system is known as an autofocus system applied to these electronic image pickup apparatuses.

The contrast detection system utilizes a phenomenon in which a captured image obtained by the image pickup device exhibits high contrast when a subject image formed on an imaging surface of the image pickup device is in an in-focus condition. Specifically, this system involves obtaining captured images in sequence, while effecting sequential changes in the imaging location of the subject image by shifting the position of a focus lens included in a shooting optical system or the position of the image pickup device. Then, this system involves calculating contrast evaluation values indicative of contrast of plural captured images obtained in sequence by the image pickup device, and judging as an in-focus location the position of the focus lens or the position of the image pickup device at which the contrast evaluation value is the maximum. The total value of high-frequency components in a spatial frequency spectrum of a captured image, for example, is used as the contrast evaluation value. A control algorithm for finding a maximum value of the contrast evaluation value for determination of the in-focus location, as mentioned above, is called "hill-climbing control."

A conventional image pickup apparatus using the contrast detection system for execution of an autofocus process includes an evaluation value calculation circuit that is the circuit designed specifically for generation of the contrast evaluation value, and an image compression circuit provided independently of the evaluation value calculation circuit. The image compression circuit compresses the data amount of uncompressed digital captured image data to generate compressed image data in JPEG (Joint Photographic Experts Group) format, JPEG 2000 format, or other formats. Such a conventional image pickup apparatus first determines the in-focus location, using as an index the contrast evaluation value calculated by the evaluation value calculation circuit, and then uses the image compression circuit to compress captured image data obtained by shooting at the in-focus location, thereby to generate compressed image data for record.

Also, Japanese Patent Application Publication No. 2003-153068 (hereinafter, referred to as Patent Document 1) discloses an image pickup apparatus including an autofocus circuit (e.g., an AE/AF processing circuit as employed in Patent Document 1) that includes an evaluation value calculation circuit and that determines the in-focus location by finding the position of the focus lens at which the contrast evaluation value is the maximum, and an image compression circuit (e.g., a compression/expansion circuit as employed in Patent Document 1) that compresses each of plural digital captured image data generated by plural shooting operations at plural focus lens positions near the in-focus location and that outputs plural compressed image data to a memory. The image pickup apparatus disclosed in Patent Document 1 selects the compressed image data to be finally recorded from among the plural compressed image data retained in the memory, in view of the fact that a sharper image of a subject in focus becomes larger in data size after image compression. Specifically, this apparatus determines as the in-focus location the position of the focus lens at which the contrast evaluation value is the maximum, then executes the plural shooting operations at the plural focus lens positions near the in-focus location, then outputs the plural compressed image data to the memory, and finally selects the compressed image data of the largest data size as the compressed image data for record from among the plural compressed image data retained in the memory.

SUMMARY

As mentioned above, the image pickup apparatus disclosed in Patent Document 1 determines the in-focus location of the focus lens, using as the index the contrast evaluation value that is distinct from the data size of the compressed image data. In other words, the image pickup apparatus disclosed in Patent Document 1 does not use the data size of the compressed image data, in the process of finding and determining the in-focus location of the focus lens or the image pickup device. Thus, the image pickup apparatus disclosed Patent Document 1 has the problem of being restricted in reduction in the scale of circuitry, because of having both the evaluation value calculation circuit and the image compression circuit as indispensable structural components.

An autofocus control circuit according to a first aspect of the present invention includes an image compression unit and a focusing unit. The image compression unit performs an image compression process on digital captured image data generated by forming a subject image and generates compressed image data for focusing. The focusing unit determines an in-focus location of the subject image, on the basis of the data size of the compressed image data for focusing.

Also, according to a second aspect of the present invention, there is provided an autofocus control method. The method includes the steps of: performing an image compression process on image data to generate compressed image data for focusing; performing an image compression process on the digital captured image data to generate compressed image data; determining an in-focus location of a subject image, on the basis of the data size of the compressed image data for focusing.

An image pickup apparatus according to a third aspect of the present invention includes a shooting optical system, an image pickup unit, an image compression unit, and a focusing unit. The image pickup unit has an image pickup device that performs photoelectric conversion of a subject image formed by the shooting optical system, and performs A/D conversion of a captured image obtained by the image pickup device to generate digital captured image data. The image compression unit performs an image compression process on the digital captured image data to generate compressed image data for focusing. The focusing unit determines an in-focus location of the subject image on the basis of the data size of the compressed image data for focusing.

The autofocus control circuit, the autofocus control method and the image pickup apparatus according to the aspects of the present invention described above perform adjustment of the in-focus location of the subject image formed by the shooting optical system on the basis of the data size of the compressed image data. Thereby, the image compression circuit provided in the image pickup apparatus for generation of compressed image data for record can also serve as the evaluation value calculation circuit that generates the contrast evaluation value to be used as the index for finding the in-focus location for an autofocus process. According to the autofocus control circuit, the autofocus control method and the image pickup apparatus according to the aspects of the present invention, therefore, it is not necessarily required that the image pickup apparatus be provided with the circuit (i.e., the evaluation value calculation circuit) designed specifically for calculation of the contrast evaluation value. Incidentally, a configuration in which the image compression circuit also serves as the evaluation value calculation circuit is illustrative only of one embodiment of the image pickup apparatus according to the present invention. In other words, the autofocus control circuit and the image pickup apparatus using at least the data size of the compressed image data as the index for adjustment of the imaging location of the subject image formed by the shooting optical system are embraced by the present invention.

According to the present invention, the image compression circuit provided in the image pickup apparatus for generation of compressed image data for record can also serve as the evaluation value calculation circuit that generates the contrast evaluation value to be used as the index for finding the in-focus location for the autofocus process.

Also, the image pickup apparatus disclosed in Patent Document 1 has to temporarily hold plural compressed image data in order to select the compressed image data of the largest data size as the compressed image data for record from among the plural compressed image data retained in the memory. Thus, this image pickup apparatus also has a problem of requiring a large working area (or memory area) for execution of the autofocus process for acquisition of the compressed image data for record.

As opposed to this, the autofocus control circuit, the autofocus control method and the image pickup apparatus according to the aspects of the present invention described above determine the in-focus location on the basis of the data size of the compressed image data. Thus, in the process of the execution of the autofocus process, the compressed image data may be discarded after the completion of acquisition of data size information on the compressed image data. In other words, there is no harm in overwriting the previous compressed image data with compressed image data formed by compressing digital captured image data obtained by new shooting. According to the autofocus control circuit, the autofocus control method and the image pickup apparatus according to the aspects of the present invention, therefore, it is not required that a great deal of compressed image data be held in the process of the execution of the autofocus process, and thus, a storage area capable of storing at least one compressed image data can be provided. This enables a reduction in the amount of memory required for the working area for the execution of the autofocus process for the acquisition of the compressed image data for record.

BRIEF DESCRIPTION OF THE DRAWINGS

FIG. 7 is a flowchart showing an autofocus process procedure performed by an imaging apparatus according to a third embodiment of the present invention.

DESCRIPTION OF THE PREFERRED EMBODIMENTS

Figure 1:
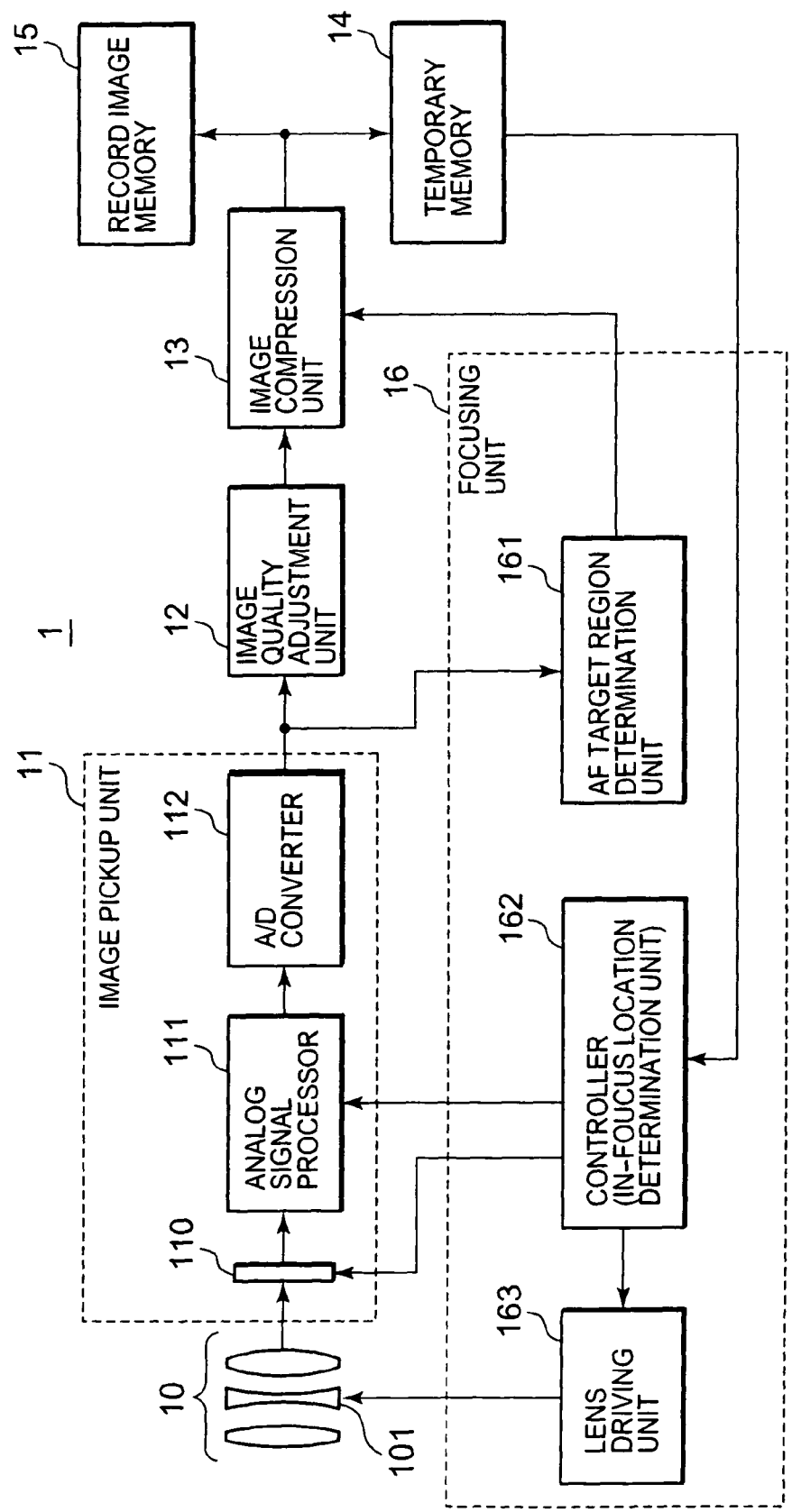
FIG. 1 is a block diagram showing an imaging apparatus according to a first embodiment of the present invention.

Detailed description will be given below with reference to the drawings with regard to specific embodiments to which the present invention is applied. In the drawings, the same structural components are designated by the same reference numerals, and repeated description will be omitted as needed for sake of clarity of explanation.

First Embodiment

FIG. 1 is a block diagram showing the main configuration of an image pickup apparatus 1 according to a first embodiment. Description will be given below in turn with regard to the structural components contained in FIG. 1. In FIG. 1, a shooting optical system 10 is a group of optical lenses for forming a subject image on an imaging surface of an image pickup device 110 to be described later. The shooting optical system 10 includes a focus lens 101. The focus lens 101 is movable in the direction of an optical axis from the shooting optical system 10 to the image pickup device 110 by a driving force of a lens driving unit 163 to be described later.

An image pickup unit 11 includes the image pickup device 110, an analog signal processor 111 and an A/D converter 112. The image pickup device 110 is a sensor that performs photoelectric conversion on a light signal entering through the shooting optical system 10 and outputs an analog image signal. The image pickup device 110 is, for example, a CCD image sensor, a CMOS image sensor, or the like.

The analog signal processor 111 performs an amplification process on the analog image signal outputted by the image pickup device 110, a noise elimination process using correlation double sampling, and other processes. The A/D converter 112 performs sampling on the analog image signal outputted by the analog signal processor 111 to generate digital captured image data.

An image quality adjustment unit 12 performs image processing, such as defect correction, white balance adjustment, color interpolation, gray level correction, color separation, and spatial filter operation, on the digital image data provided from the A/D converter 112. As employed herein, the defect correction refers to a process for substituting the pixel value of a defective pixel of the image pickup device by a compensation value calculated from the pixel value of a peripheral pixel. Also, the white balance adjustment refers to a process for adjusting the white balance of the captured image. Also, the color interpolation refers to a process for generating a pixel value having RGB color information from the pixel value of the digital captured image data having color information of Bayer arrangement. Also, the gray level correction refers to a process for adjusting the pixel value of the digital captured image data based on the spectral sensitivity of the image pickup device. Also, the color separation refers to a process for generating a luminance signal (Y signal) and color difference signals (Cr signal and Cb signal) from the RGB color information. Finally, the spatial filter operation refers to a process for performing edge enhancement and noise elimination on the digital captured image data, using a low-pass filter, a high-pass filter, or the like.

An image compression unit 13 performs a data compression process on the digital captured image data after image quality adjustment. In the first embodiment, the image compression unit 13 performs compression into a JPEG format. A coding method adopted for JPEG is to generate spatial frequency information (DCT coefficient) of the digital captured image data by performing discrete cosine transform using a block of 64 pixels, 8 pixels by 8 pixels, as a process unit, and subject the generated spatial frequency information to entropy coding (specifically, Huffman coding) to thereby compress the amount of data.

Also, the image compression unit 13 according to the first embodiment is configured not only to perform the image compression process on the overall digital captured image data, but also to perform the image compression process only on a portion specified as an AF target region in the captured image by an autofocus target region determination unit (hereinafter, an AF target region determination unit) 161 to be described later.

A temporary memory 14 is the memory that temporarily stores the compressed image data compressed by the image compression unit 13. The temporary memory 14 according to the first embodiment can hold the compressed image data generated from at least one captured image. Data in the temporary memory 14 is overwritten with the compressed image data newly generated by the image compression unit 13.

Incidentally, of course, the temporary memory 14 may have capacity capable of storing plural compressed image data. For example, the temporary memory 14 may be the memory capable of holding at least two compressed image data in order to make it easy for a focusing unit 16 to make a comparison between the data size of newly generated compressed image data and the data size of compressed image data immediately previously generated. In this instance, the image compression unit 13 sequentially overwrites one compressed image data on the old captured image of the two compressed image data stored in the temporary memory 14, with the newly generated compressed image data.

A record image memory 15 is the memory that stores record compressed image data obtained by compressing a captured image picked up in focus after the completion of an autofocus process by the focusing unit 16 to be described later.

The JPEG coding method involves subjecting the DCT coefficient indicative of the spatial frequency spectrum to the Huffman coding, thereby performing data compression, and thus, a captured image of higher contrast containing many high-frequency components tends to increase the data size of compressed image data. Utilizing this property, the focusing unit 16 executes autofocus using as an index the data size of the compressed image data generated by the image compression unit 13.

In the instance of the configuration shown in FIG. 1, the focusing unit 16 includes the AF target region determination unit 161, a controller 162 and a lens driving unit 163. The AF target region determination unit 161 determines an AF target region from captured images. For example, the AF target region determination unit 161 selects a region of high contrast as an AF target region from the captured images. Alternatively, for example, the AF target region determination unit 161 may use a known face detection algorithm to select as the AF target region a region containing a human's face detected from among captured images generated by the image pickup unit 11.

The controller 162 determines whether an image is in focus on the imaging surface of the image pickup device 110, using as an index the data size of the compressed image data generated by the image compression unit 13 and stored in the temporary memory 14, and determines as the in-focus location the position of the focus lens 101 at which the image is in focus. More specifically, the controller 162 causes the image pickup unit 11 to sequentially obtain captured images, while effecting movement of the position of the focus lens 101, and determines the position of the focus lens 101 at which the data size after image compression is the maximum. For example, the controller 162 continues shooting while moving the focus lens 101 in a direction in which the data size of the compressed image data increases, and compares the data size of the compressed image data obtained by new shooting with the data size of the compressed image data obtained by the previous shooting. Then, at the time when the data size of the compressed image data turns to decrease, the controller 162 determines as the maximum value the data size of the compressed image data obtained by the previous shooting, and determines as the in-focus location the position of the focus lens 101 at the time of the previous shooting. Incidentally, an approximate curve such as a Gaussian curve or a quadric curve, or a characteristic curve obtained by experiment may be used to approximate the relation between the position of the focus lens 101 and the data size of the compressed image data, and to expect the in-focus location at which the data size is the maximum. Also, a determination on whether an image is in focus, which is made by the controller 162 using the data size of the compressed image data as the index, is not limited to these specific examples, and various known algorithms for finding the in-focus location, pertaining to "hill-climbing control," may be applied to the determination.

The lens driving unit 163 effects movement of the focus lens 101 in the direction of the optical axis under control of the controller 162.

Figure 2:
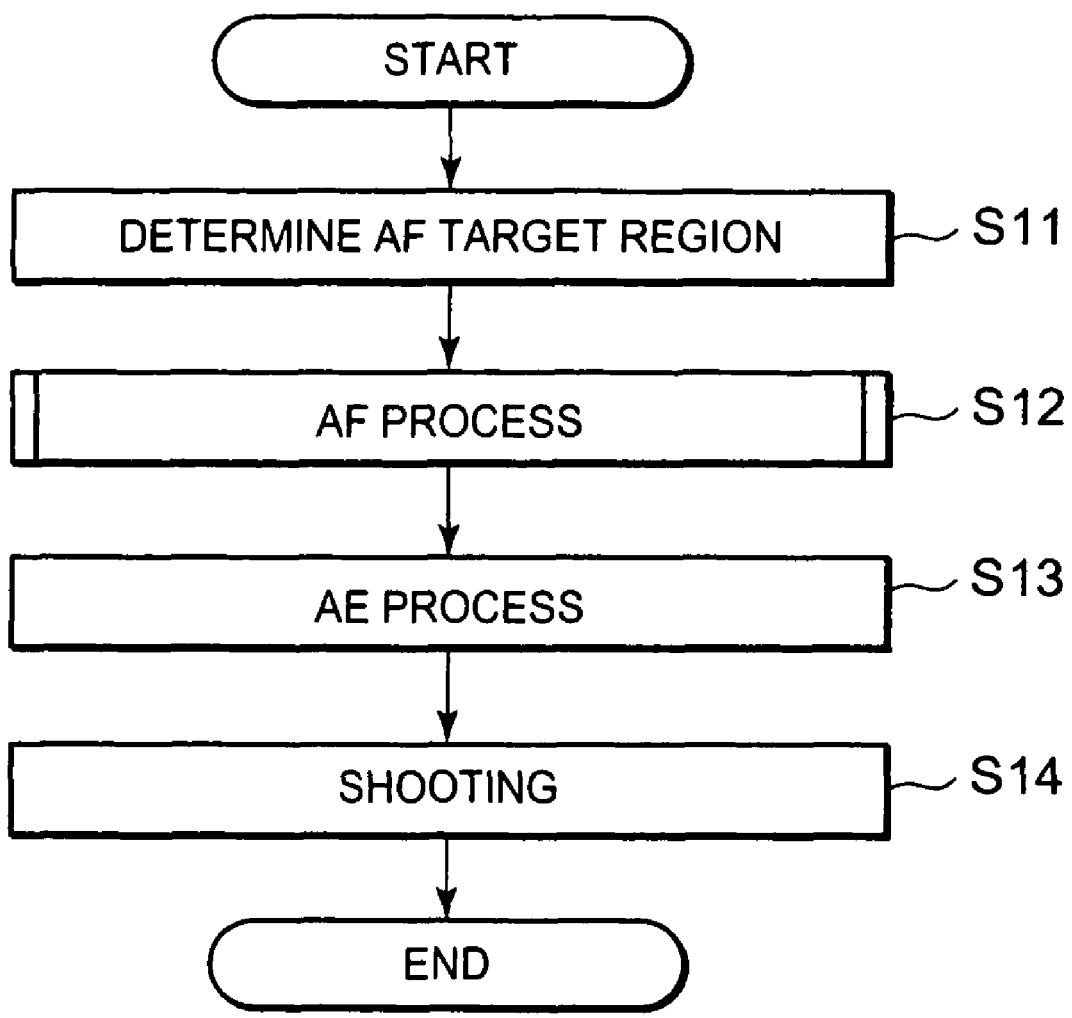
FIG. 2 is a flowchart showing an shooting procedure performed by the imaging apparatus according to the first embodiment of the present invention.

Next, detailed description will be given below with regard to a shooting execution procedure by the image pickup apparatus 1, and an autofocus process procedure executed by the focusing unit 16. FIG. 2 is a flowchart showing the shooting execution procedure by the image pickup apparatus 1. At step S11, the AF target region determination unit 161 determines the AF target region. At step S12, the autofocus process is executed to determine the in-focus location of the focus lens 101 under control of the controller 162.

At step S13, subsequent to the autofocus process, an auto exposure (AE) process is executed so that the captured image has proper brightness. Finally, at step S14, new shooting is performed with the autofocus process and the auto exposure process completed. Compressed image data obtained at step S14 is stored in the record image memory 15. Incidentally, the image pickup apparatus 1 can perform a series of processes including the determination of the AF target region (step S11), the autofocus process (step S12), the auto exposure process (step S13) and the execution of shooting (step S14), as shown in FIG. 2, for example in response to a camera operator's press of a shutter button (not shown) provided in the image pickup apparatus 1.

Figure 3:
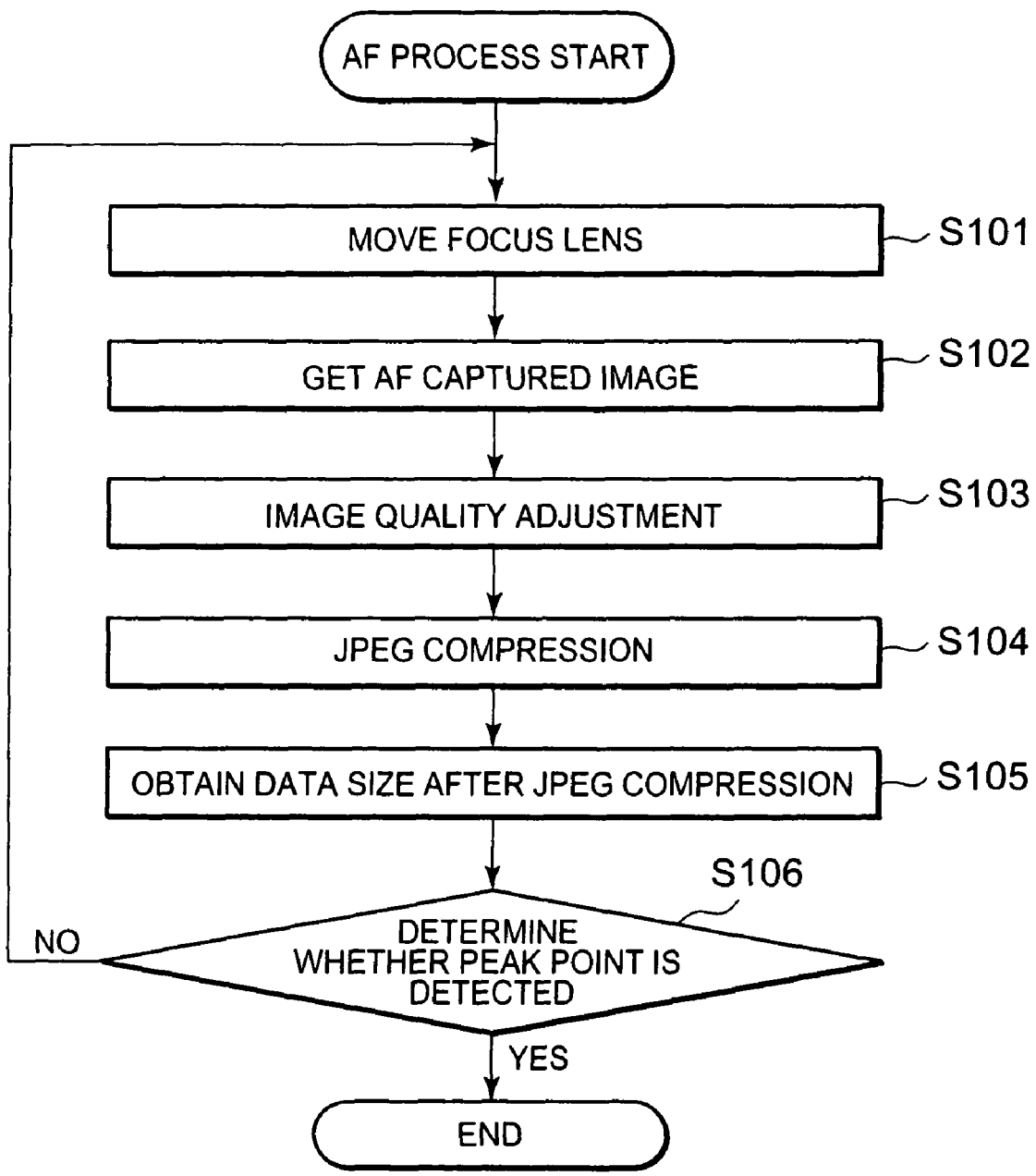
FIG. 3 is a flowchart showing an autofocus process procedure performed by the imaging apparatus according to the first embodiment of the present invention.

FIG. 3 is a flowchart showing an example of a detailed procedure of the autofocus process (step S12 of FIG. 2). At steps S101 and S102, while the focus lens 101 is moved at a predetermined speed, the image pickup unit 11 obtains a captured image. Incidentally, the focus lens 101 may be moved at a predetermined step width to obtain the captured image. At step S103, the image quality adjustment unit 12 adjusts the image quality of digital captured image data generated by the image pickup unit 11. At step S104, the image compression unit 13 compresses a partial image, corresponding to the AF region, of the digital captured image data after the image quality adjustment, and generates compressed image data in the JPEG format. The generated compressed image data is stored in the temporary memory 14.

At step S105, the controller 162 obtains the data size of the compressed image data stored in the temporary memory 14. At step S106, the controller 162 executes an algorithm for finding the position of the focus lens 101 at which the data size of the compressed image data is of a maximum value (hereinafter called a peak point). Specifically, as mentioned above, the controller 162 executes a known hill-climbing control algorithm using the data size of the compressed image data as the index, to find the maximum value of the data size of the compressed image data.

The controller 162 performs a comparison between the data size obtained at step S105 and the data size of the previous compressed image data, and, if the peak point is detected, the controller 162 determines that the detected position is the in-focus location, and brings the AF process to an end. On the other hand, in a case, for example, where the data size obtained at step S105 exhibits a tendency to increase monotonically as compared to the data size of the previous compressed image data, the controller 162 cannot detect the peak point. Thus, the controller 162 returns to step S101 to continue the process.

As mentioned above, the image pickup apparatus 1 according to the first embodiment uses the data size of the compressed image data as the index to adjust the imaging location of the subject image by the shooting optical system 10. Thus, output data from the image compression unit 13 provided in the image pickup apparatus 1 in order to generate the compressed image data for record can be utilized for execution of the autofocus process. This eliminates the need to provide an evaluation value calculation circuit for generating a contrast evaluation value to be used as the index for finding the in-focus location.

Also, in the process of the execution of the autofocus process, the image pickup apparatus 1 may discard the compressed image data after the completion of acquisition of data size information on the compressed image data. Thus, the image pickup apparatus 1 according to the first embodiment may overwrite data in the temporary memory 14 that stores the compressed image data for the autofocus process, with compressed image data generated in response to new shooting. Thus, it is appropriate that the temporary memory 14 can hold about one or two compressed image data, as mentioned above. Thus, the image pickup apparatus 1 can reduce the amount of memory in the temporary memory 14 required for an operating area in the process between the execution of the autofocus process and the acquisition of the compressed image data for record, as compared to the image pickup apparatus disclosed in Patent Document 1, which has to hold a lot of compressed image data in the temporary memory at a time in order to select one data of the largest size from among a lot of compressed image data.

Also, recently, the number of pixels of the image pickup device has been steadily increasing, and a defect in of the image pickup device or noise caused by a peripheral electronic circuit causes deterioration in the image quality of RAW image data with the increasing number of pixels of the image pickup device. The deterioration in the image quality of the RAW image data can possibly cause deterioration in performance of the autofocus process using the contrast evaluation value generated directly from the RAW image data. As opposed to this, the image pickup apparatus 1 uses as the index of the autofocus process the data size of the compressed image data generated from the digital captured image data after the image quality adjustment such as the noise elimination and the edge enhancement, rather than the RAW image data in itself outputted by the image pickup unit 11. Thus, the image pickup apparatus 1 can suppress the influence of a defect or noise in the image pickup device 110 upon autofocus accuracy and thus can determine the in-focus location with accuracy.

Also, the autofocus system using as the index the contrast evaluation value calculated by use of the RAW image data reflects the luminance and also often uses only G pixels, the number of which is the largest in the Bayer arrangement, for calculation of the contrast evaluation value. In other words, contrast evaluation is performed depending on a change in the luminance of the captured image. As opposed to this, the image pickup apparatus 1 can utilize for the autofocus process the data size of the compressed image data obtained by performing compression coding on all of RGB or all of the luminance signal (Y) and the color difference signals (Cr and Cb). In other words, the image pickup apparatus 1 can use not only the change in the luminance of the captured image but also the index that reflects the contrast formed by color variations, for the determination of the in-focus location. Thus, the image pickup apparatus 1 can perform the autofocus process on various captured images with accuracy.

Also, the image pickup apparatus 1 performs the image compression on a part of the captured image determined as the AF target region, in the process of the execution of the autofocus process, and thus, the image pickup apparatus 1 can reduce computational complexity required for the image compression and thus reduce the time required for the autofocus process, as compared to image compression on the overall digital captured image data.

Incidentally, the process executed by the AF target region determination unit 161 and the controller 162 shown in FIG. 1 can be implemented by executing a program on a computer having a CPU (central processing unit).

Figure 4:
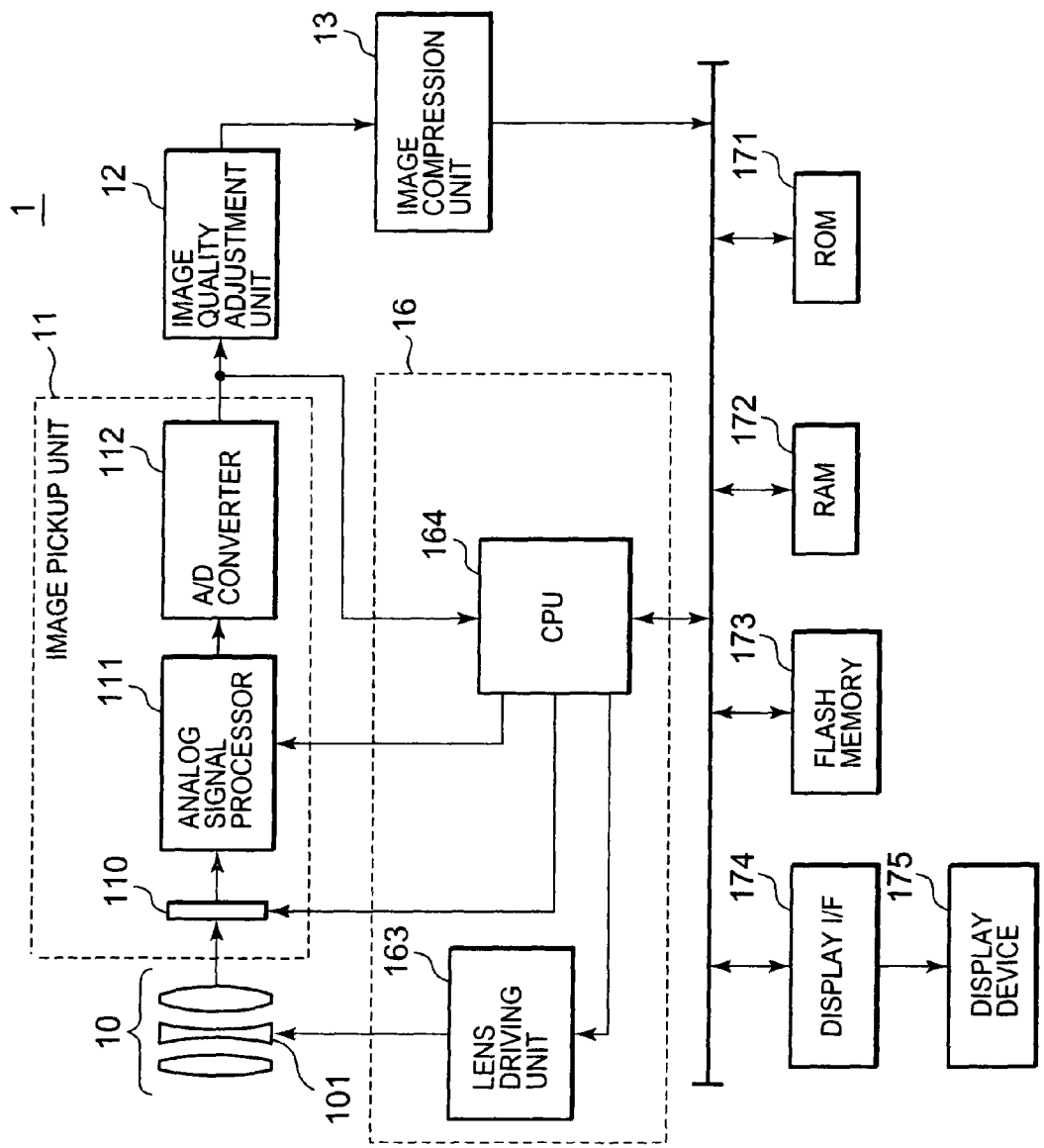
FIG. 4 is a block diagram showing an example of the configuration of the imaging apparatus according to the first embodiment of the present invention.

FIG. 4 shows a specific example of the configuration of the image pickup apparatus 1 having the CPU built-in. A block diagram of FIG. 4 shows the main configuration of the image pickup apparatus 1 shown in FIG. 1, having an addition of a structural element such as a display device useful for the image pickup apparatus 1 as applied to a digital camera product. In FIG. 4, a CPU 164 reads out and executes a program stored in a ROM (read only memory) 171, a RAM (random access memory) 172 or a flash memory 173 to thereby execute the process associated with the AF target region determination unit 161 and the controller 162. The RAM 172 is used, for example, for storage of the compressed image data for the autofocus process. In this instance, the RAM 172 corresponds to the temporary memory 14 mentioned above. On the other hand, the flash memory 173 is used, for example, for storage of the compressed image data for record. In this instance, the flash memory 173 corresponds to the record image memory 15. A display device 175 displays an image provided through a display interface 174. The display device 175 provides display of the captured images (or through-images) outputted in sequence by the image pickup unit 11, display of a face region detected by the execution of the face detection algorithm, display of the through-image after the completion of the autofocus process, display of the captured image obtained by the camera operator's press of the shutter button (not shown), and the like.

Second Embodiment

By referring to the first embodiment of the present invention mentioned above, description has been given with regard to a specific example of the image pickup apparatus using the data size of the compressed image data as the index for the determination of the in-focus location. However, the first embodiment of the present invention is illustrative only of one example of the image pickup apparatus using the data size of the compressed image data as the index for the execution of the autofocus process. An image pickup apparatus 2 according to a second embodiment is the image pickup apparatus that uses other contrast evaluation values in addition to and in combination with the data size of the compressed image data, for the determination of the in-focus location.

Figure 5:
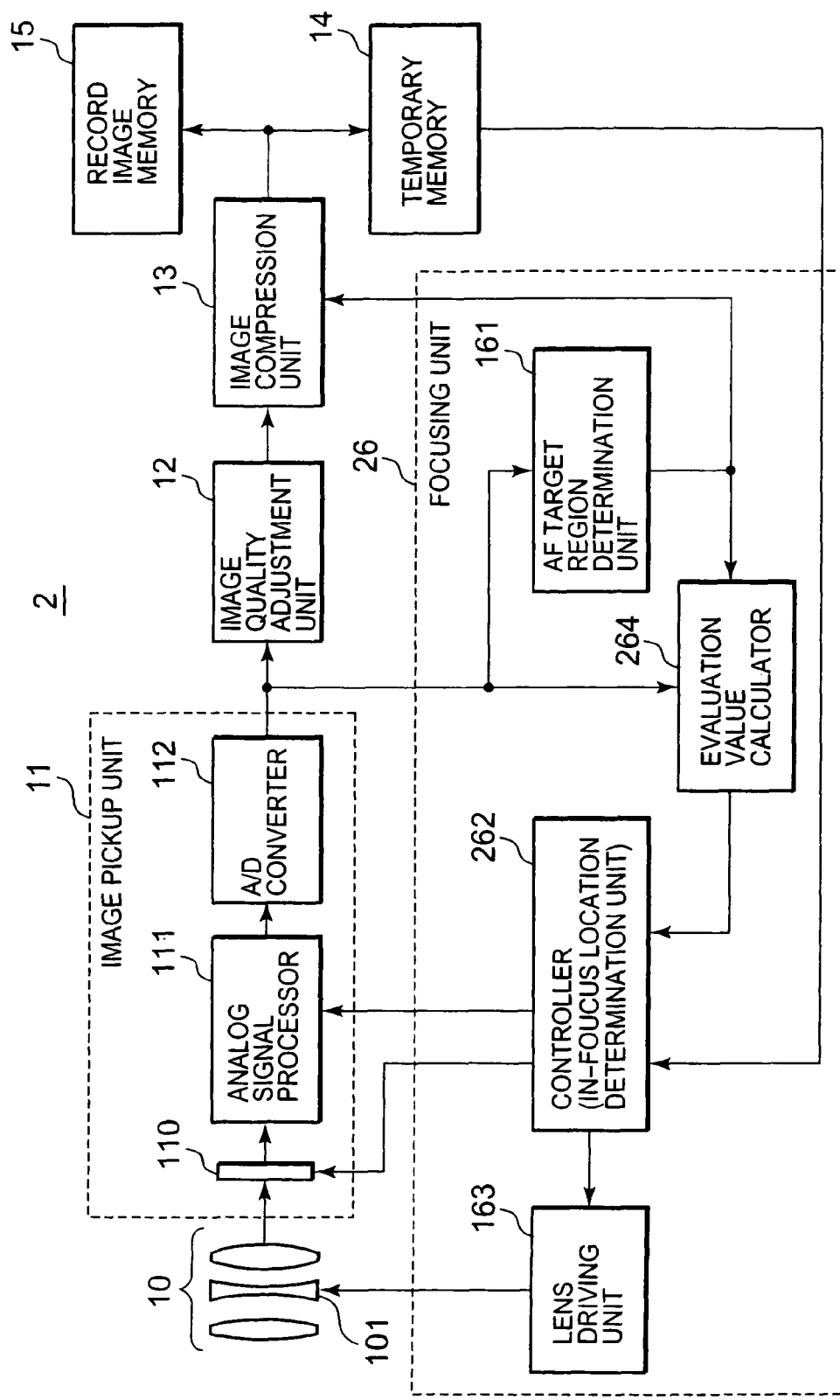
FIG. 5 is a block diagram showing an imaging apparatus according to a second embodiment of the present invention.

FIG. 5 is a block diagram showing the main configuration of the image pickup apparatus 2 according to the second embodiment. The points of difference between the block diagram shown in FIG. 1 and FIG. 5 are that an evaluation value calculator 264 that performs calculation of a contrast evaluation value is provided, and that a controller 262 uses the data size of the compressed image data and the contrast evaluation value calculated by the evaluation value calculator 264 as the index for the determination of the in-focus location.

The evaluation value calculator 264 calculates the contrast evaluation value on a region of captured image data corresponding to at least an AF target region. Various parameters that reflect the magnitude of contrast of a captured image can be used as the contrast evaluation value. For example, the magnitude of high-frequency components in the AF target region can be used as the contrast evaluation value. Also, for example, the total value of pixel value differences, which is obtained by calculating the pixel value difference (an absolute value) between horizontally or vertically adjacent pixels for each of pixels in the AF target region and then adding up the obtained pixel value differences in the AF target region, may be used as the contrast evaluation value.

The controller 262 uses both the data size of the compressed image data stored in the temporary memory 14 and the contrast evaluation value calculated by the evaluation value calculator 264 as the index for the determination of the in-focus location of the focus lens 101.

Figure 6:
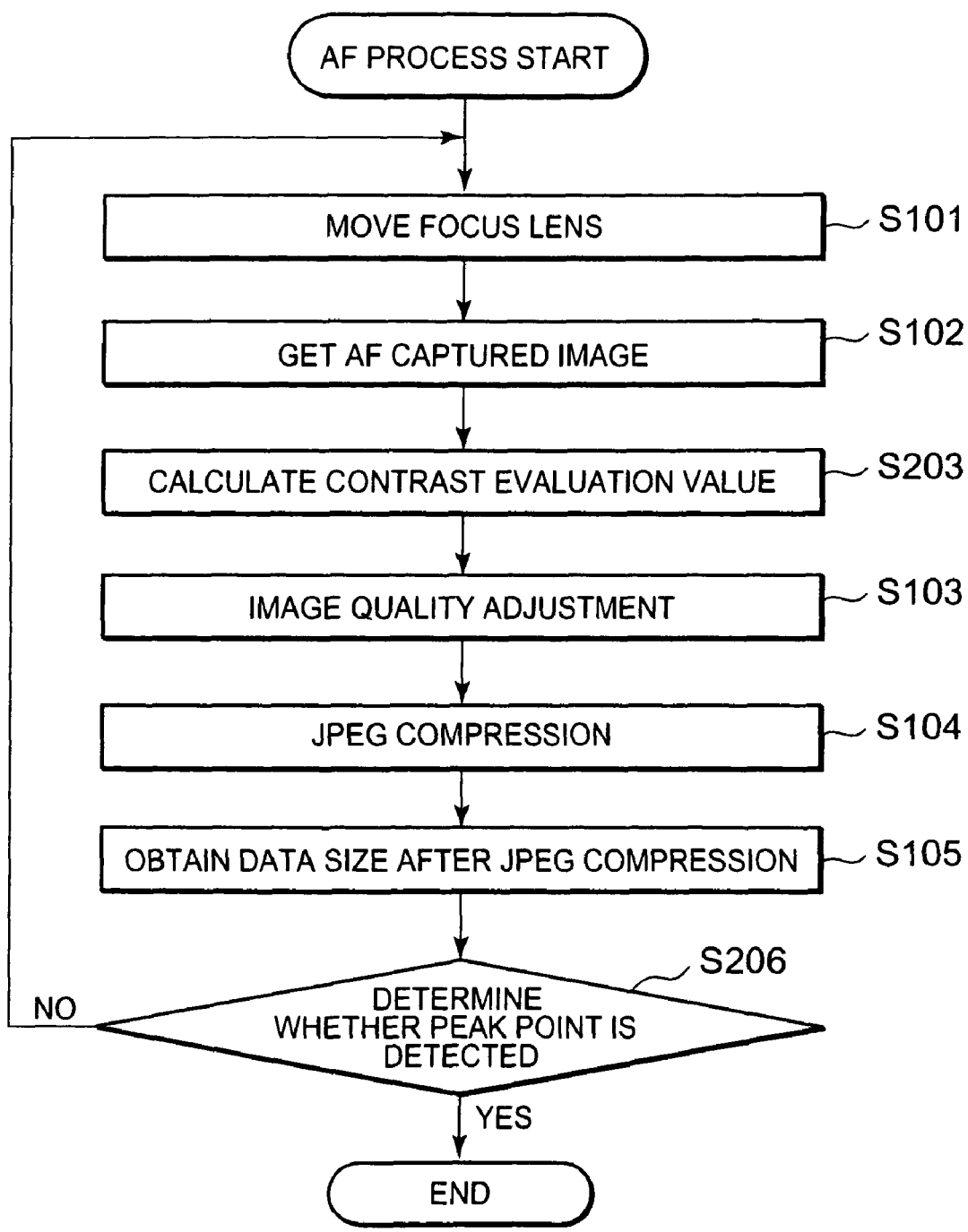
FIG. 6 is a flowchart showing an autofocus process procedure performed by the imaging apparatus according to the second embodiment of the present invention.

FIG. 6 is a flowchart showing an example of a detailed procedure of the autofocus process by the image pickup apparatus 2. Of process steps shown in FIG. 6, the same process steps as shown in FIG. 3 are designated by the same reference characters (S101 to S105) as shown in FIG. 3. Description of these process steps will be omitted.

At step S203, the evaluation value calculator 264 calculates the contrast evaluation value of digital captured image data generated by the image pickup unit 11. Incidentally, in FIG. 6, steps S203 and S103 are in defined order for the sake of convenience; however, the order of execution of these steps is not specifically limited. Steps S203 and S103 may be executed in parallel, or step S103 may be executed prior to step S203.

At step S206, the controller 262 finds the position (or the peak point) of the focus lens 101 at which the data size of the compressed image data is of a maximum value and the contrast evaluation value is of a maximum value. If the peak point is detected, the detected peak point is determined as the in-focus location, and the AF process is brought to an end. On the other hand, if the peak point is not detected, the controller 262 returns to step S101 to continue the process.

Incidentally, step S206 for the determination of the in-focus location can be performed, for example, in the following manner. For example, the determination of the in-focus location can be made in accordance with a difference in brightness of an environment for imaging, using the contrast evaluation value as the index if the environment for imaging is bright, or using the data size of the compressed image data as the index if the environment for imaging is dark. If shooting takes place in a dim environment, noise enhancement occurs and thus causes little change in the luminance of a captured image, thus making it difficult to detect the peak point of the focus lens 101, using as the index the contrast evaluation value using the G component of digital captured image data. Thus, in the dim environment for imaging, the data size of the compressed image data can be used for improvement in the accuracy of the autofocus process. Incidentally, selection between the contrast evaluation value and the data size of the compressed image data for use as the index can be automatically made based on the magnitude of the pixel value of the digital captured image data, or may be made in accordance with a change in shooting mode of a digital camera to which the image pickup apparatus 2 is applied.

Also, the determination of the peak point may be made in the following manner: two peak points are determined using two evaluation values (i.e., the contrast evaluation value and the data size of the compressed image data), and a comparison is performed between the peak point determined by using the contrast evaluation value as the index and the peak point determined by using the data size of the compressed image data as the index. If the two peak points are different, it is possible that an erroneous determination has been made, resulting from a pseudo-peak appearing due to the influence of noise or the like in any one of the contrast evaluation value and the data size of the compressed image data. Thus, the comparison between the two peak points enables preventing the erroneous determination of the in-focus location, thus improving the accuracy of the autofocus process. Specifically, if a deviation of two in-focus locations from each other exceeds a predetermined threshold value, the following procedure can be performed to select one of the two peak points and to determine the selected peak point as the in-focus location. Specifically, a comparison is performed between the ratio between the maximum and minimum values of the contrast evaluation value (i.e., the maximum value/minimum value ratio) and the ratio between the maximum and minimum values of the data size of the compressed image data (i.e., the maximum value/minimum value ratio) obtained in the process of finding the peak point, and the peak point at which the larger ratio is obtained is selected. Incidentally, if the deviation of the two in-focus locations from each other exceeds the predetermined threshold value, the autofocus process may be re-executed.

Third Embodiment

By referring to the second embodiment of the present invention mentioned above, description has been given with regard to an example of the image pickup apparatus using both the data size of the compressed image data and other contrast evaluation values for the determination of the in-focus location. An image pickup apparatus according to a third embodiment is another example of the image pickup apparatus using both the data size of the compressed image data and other contrast evaluation values for the determination of the in-focus location.

Incidentally, the configuration of the image pickup apparatus according to the third embodiment can be the same as that of the image pickup apparatus 2 shown in FIG. 4. Thus, the block diagram of the configuration of the image pickup apparatus according to the third embodiment and detailed description thereof will be omitted. Hereinafter, the reference numerals of the structural components of the image pickup apparatus 2 shown in FIG. 4 will be employed to make reference to the structural components of the image pickup apparatus according to the third embodiment.

FIG. 7 is a flowchart showing an example of a detailed procedure of the autofocus process executed by the image pickup apparatus according to the third embodiment. Of process steps shown in FIG. 7, the same process steps as shown in FIG. 3 are designated by the same reference characters (S101 to S106) as shown in FIG. 3. Description of these process steps will be omitted.

At step S301, the moving speed of the focus lens 101 is set at V1. At steps S302 and S303, while the focus lens 101 is moved at the speed V1, the image pickup unit 11 obtains a captured image. At step S304, the evaluation value calculator 264 calculates the contrast evaluation value of digital captured image data generated by the image pickup unit 11.

At step S305, the controller 262 executes the algorithm for finding the contrast evaluation value under the so-called hill-climbing control to determine whether or not the focus lens 101 has passed the peak point, that is, a point at which the contrast evaluation value is of a maximum value. Specifically, a comparison is performed between the contrast evaluation value calculated at step S304 and the previous contrast evaluation value, and, when the contrast evaluation value having a tendency to monotonically increase begins to decrease, a determination is made that the focus lens 101 has passed the peak point. If the passage of the peak point is not detected, the controller 262 returns to step S302 to repeat the process. On the other hand, if the passage of the peak point is detected, the controller 262 goes to step S306.

At step S306, the moving speed of the lens is changed to V2 that is lower than V1 and opposite in direction to V1. At steps S101 and S102 subsequent to step S306, while the focus lens 101 is moved at the speed V2, the image pickup unit 11 obtains a captured image. Thereafter, the same processes as steps S101 to S106 shown in FIG. 3 are performed to determine as the in-focus location the position of the focus lens 101 at which the compressed image data is of a maximum value. Incidentally, of course, it is to be understood that the above-mentioned algorithm for determining the in-focus location is illustrative only, and other known hill-climbing control algorithms may be used.

As mentioned above, the image pickup apparatus according to the third embodiment uses the contrast evaluation value calculated by the evaluation value calculator 264 as the index to find roughly the in-focus location, in the first half of the autofocus process for which the moving speed of the lens is set high. Then, the image pickup apparatus uses the data size of the compressed image data as the index for the determination of the in-focus location, in the second half of the autofocus process for which the moving speed of the lens is set low. This eliminates the need for the image compression process in the first half of the autofocus process. Therefore, this enables reducing the time required for the autofocus process by a difference between the time required for the image compression and the time required for the calculation of the contrast evaluation value.

Other Embodiments

By referring to the first to third embodiments of the present invention mentioned above, description has been given with regard to an instance where the focus lens 101 included in the shooting optical system 10 is moved for adjustment of the imaging location of the subject image. However, the image pickup device 110 may be moved for the adjustment of the imaging location of the subject image.

Also, by referring to the first to third embodiments of the present invention mentioned above, description has been given assuming that the temporary memory 14 stores at least one compressed image data. However, the image compression unit 13 may be configured to obtain the data size, rather than output the compressed image data to the memory. In this instance, the controller 162 or 262 can receive input of the data size obtained by the image compression unit 13 for the determination of the in-focus location. Such a configuration eliminates the need to provide the temporary memory 14, thus enabling a further reduction in the amount of memory required for the working area in the process of the execution of the autofocus process for the acquisition of the compressed image data for record.

Also, by referring to the first to third embodiments of the present invention mentioned above, description has been given with regard to an instance where the image compression unit 13 uses the JPEG coding method for the image compression. However, a JPEG 2000 coding method that involves wavelet transformation may be used as the coding method applied to the image compression unit 13. Alternatively, as in the case of JPEG and JPEG 2000, the image compression unit 13 may employ a different coding method involving performing information conversion of digital captured image data into frequency representation by discrete Fourier transform, discrete cosine transform, wavelet transformation, or the like, and then performing compression coding. In other words, a different coding method may be applied that has a positive correlation between the amount of information in the frequency representation and the data size after the compression.

Also, by referring to the first to third embodiments of the present invention mentioned above, description has been given with regard to an example of the configuration in which the image compression takes place only in the AF target region. However, the configuration may be such that compressed image data is generated for the overall captured image and the data size of the compressed image data is used as the index for the determination of the in-focus location. In this instance, the AF target region determination unit 161 may be omitted from the configurations described with reference to the first to third embodiments of the present invention mentioned above.

Also, the image pickup apparatus according to any one of the first to third embodiments of the present invention mentioned above may change a compression rate, target data for compression, or the like so that the compression rate, the target data for compression, or the like for generation of compressed image data for record is different from those for generation of compressed image data for the autofocus process. For example, user-specified low-compression-rate high-quality image data may be used as the compressed image data for record, while high-compression-rate low-quality image data maybe used as the compressed image data for the autofocus process, as compared to the compressed image data for record. Also, for example, the compressed image data for the autofocus process may be generated only for the G component or luminance component of digital captured image data. This enables a reduction in the size of the temporary memory 14 and also enables a reduction in computational complexity required for the generation of the compressed image data for the autofocus process.

It is apparent that the present invention is not limited to the above embodiments, but may be modified and changed without departing from the scope and spirit of the invention.

What is claimed is:

1. A autofocus control circuit, comprising:
an image compression unit performing an image compression process on digital captured image data generated by providing a subject image to generate compressed image data for focusing; and
a focusing unit determining an in-focus location of said subject image based on a size of said compressed image data,
wherein said image compression unit changes a data compression ratio so that said data compression ratio of said compressed image data generated for determination of said in-focus location by said focusing unit is different from that of second compressed image data for recording generated after said in-focus location is determined.

2. The autofocus control circuit according to claim 1, wherein said focusing unit determines said in-focus location based on a change in size of a plurality of said compressed image data obtained by shooting said subject image at varying imaging locations.

3. The autofocus control circuit according to claim 2, wherein said focusing unit determines, as said in-focus location, one of said imaging locations at which said size of said compressed image data is the maximum.

4. The autofocus control circuit according to claim 1, further comprising:
a temporary memory storing said compressed image data, wherein
said focusing unit determines said in-focus location utilizing said size of said compressed image data recorded in said temporary memory, and said compressed image data in said temporary memory is overwritten with compressed image data obtained by new shooting, at least while said focusing unit determines said in-focus location.

5. The autofocus control circuit according to claim 1, wherein said focusing unit uses, as said compressed image data compressed image data generated for said digital captured image data corresponding to a partial region of a captured image.

6. The autofocus control circuit according to claim 5, further comprising:
an autofocus target region determination unit that determines said partial region of said captured image as an autofocus target region, wherein
said image compression unit generates said compressed image data for partial image data, corresponding to said autofocus target region, in said digital captured image data at least while said focusing unit determines said in-focus location.

7. An autofocus control method comprising:
performing an image compression process on image data to generate compressed image data for focusing; and
determining an in-focus location of a subject image based on a size of said compressed image data; and
changing a data compression ratio so that said data compression ratio of said compressed image data is different from that of second compressed image data for recording generated.

8. The autofocus control method according to claim 7, wherein said in-focus location is determined based on a change in size of a plurality of compressed image data obtained by shooting said subject image at varying imaging locations.

9. The autofocus control method according to claim 8, wherein said imaging location of said subject image at which said size of said compressed image data is the maximum is determined as said in-focus location.

10. The autofocus control method according to claim 7, wherein
said compressed image data in a temporary memory is overwritten with compressed image data obtained by new shooting, at least while said imaging location is adjusted, and
said size of said compressed image data overwritten in sequence in said temporary memory is used for determination of said in-focus location.

11. The autofocus control method according to claim 7, wherein compressed image data generated for a partial region of a captured image is used as said compressed image data.

12. An image pickup apparatus comprising:
a shooting optical system;
an image pickup unit including an image pickup device performing photoelectric conversion of a subject image formed by said shooting optical system, and that performs A/D conversion of a captured image obtained by said image pickup device to generate digital captured image data;
an image compression unit performing an image compression process on said digital captured image data to generate compressed image data; and
a focusing unit determining an in-focus location of said subject image based on said size of said compressed image data,
wherein said image compression unit changes a data compression ratio so that said data compression ratio of said compressed image data generated for determination of said in-focus location by said focusing unit is different from that of second compressed image data for recording generated after said in-focus location is determined.

13. The image pickup apparatus according to claim 12, wherein said focusing unit determines said in-focus location based on a change in size of a plurality of said compressed image data obtained by shooting said subject image while shifting the position of at least any one of the image pickup device and a focus lens included in said shooting optical system, and shifts the position of any one of said focus lens and said image pickup device to said in-focus location.

14. The image pickup apparatus according to claim 13, wherein said focusing unit determines, as said in-focus location, one of said imaging locations at which said size of said compressed image data is the maximum.

15. The image pickup apparatus according to claims 13, further comprising:
a temporary memory that storing said compressed image data, wherein
said focusing unit determines said in-focus location, utilizing said size of said compressed image data recorded in said temporary memory, and
said compressed image data in said temporary memory is overwritten with said compressed image data obtained by new shooting, at least while said focusing unit determines said in-focus location.

16. The image pickup apparatus according to claim 12, wherein said focusing unit uses compressed image data generated for a partial region of said captured image, as said compressed image data.

17. The image pickup apparatus according to claim 16, further comprising:
an autofocus target region determination unit determining said partial region of said captured image as an autofocus target region, wherein
said image compression unit generates said compressed image data for partial image data, corresponding to said autofocus target region, in said digital captured image data at least while said focusing unit determines said in-focus location.

* * * * *